(12) United States Patent
Andersen et al.

(10) Patent No.: US 11,198,094 B2
(45) Date of Patent: Dec. 14, 2021

(54) NON-PGM AMMONIA SLIP CATALYST (71) Applicant: Johnson Matthey Public Limited Company, London (GB)

(72) Inventors: Paul Joseph Andersen, Plymouth Meeting, PA (US); Kevin Doura, Plainsboro, NJ (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/726,924

(22) Filed: Jun. 1, 2015

(65) Prior Publication Data
US 2015/0352492 A1 Dec. 10, 2015

Related U.S. Application Data (60) Provisional application No. 62/007,608, filed on Jun. 4, 2014.

(51) Int. Cl.
*B01D 53/86* (2006.01)
*B01J 23/10* (2006.01)
(Continued)

(52) U.S. Cl.
CPC ..... *B01D 53/8634* (2013.01); *B01D 53/9436* (2013.01); *B01J 21/04* (2013.01);
(Continued)

(58) Field of Classification Search
CPC ........ B01D 53/8634; B01D 2255/2065; B01D 2255/20715; B01D 2255/2073; B01D 2255/20738; B01D 2255/20761; B01D 2255/2092; B01D 2255/502; B01D 2255/9022; B01J 21/04; B01J 23/10;
(Continued)

(56) References Cited

U.S. PATENT DOCUMENTS

| | | | |
|---|---|---|---|
| 4,010,238 | A | 3/1977 | Shiraishi et al. |
| 4,085,193 | A | 4/1978 | Nakajima et al. |

(Continued)

FOREIGN PATENT DOCUMENTS

| | | |
|---|---|---|
| CN | 103079693 A | 5/2013 |
| EA | 200600595 A1 | 8/2006 |

(Continued)

OTHER PUBLICATIONS

Mirzaei et al., "Characterisation of copper-manganese oxide catalysts: effect of precipitate ageing upon the structure and morphology of precursors and catalysts", Applied Catalysis A: General 253 (2003) 499-508. (Year: 2003).*

*Primary Examiner* — Anita Nassiri-Motlagh (57) ABSTRACT

An ammonia slip catalyst having an SCR catalyst and an oxidation catalyst comprising at least two metals, each of which is selected from a specific group, and a substrate upon which at least oxidation catalyst is located is described. The ammonia slip catalyst can have dual layers, with one of the layers containing an SCR catalyst, a second layer containing the oxidation catalyst with comprises at least two metals, each of which is selected from a specific group, and the ammonia slip catalyst does not contain a platinum group metal. Methods of making and using the ammonia slip catalyst to reduce ammonia slip are described.

13 Claims, 4 Drawing Sheets

(51) Int. Cl.

| | | |
|---|---|---|
| *B01J 21/04* | (2006.01) | |
| *B01J 37/02* | (2006.01) | |
| *B01J 35/00* | (2006.01) | |
| *B01J 29/24* | (2006.01) | |
| *B01J 29/14* | (2006.01) | |
| *B01J 23/889* | (2006.01) | |
| *B01J 37/08* | (2006.01) | |
| *B01J 37/03* | (2006.01) | |
| *B01J 37/00* | (2006.01) | |
| *B01D 53/94* | (2006.01) | |
| *B01J 29/76* | (2006.01) | |
| *B01J 35/02* | (2006.01) | |
| *B01J 23/83* | (2006.01) | |
| *B01J 29/85* | (2006.01) | |
| *B01J 29/68* | (2006.01) | |
| *B01J 29/46* | (2006.01) | |
| *B01J 29/72* | (2006.01) | |

(52) U.S. Cl.
CPC ............... *B01J 23/10* (2013.01); *B01J 23/83* (2013.01); *B01J 23/8892* (2013.01); *B01J 29/14* (2013.01); *B01J 29/24* (2013.01); *B01J 29/46* (2013.01); *B01J 29/68* (2013.01); *B01J 29/7215* (2013.01); *B01J 29/763* (2013.01); *B01J 29/7615* (2013.01); *B01J 29/85* (2013.01); *B01J 35/0006* (2013.01); *B01J 35/023* (2013.01); *B01J 37/0036* (2013.01); *B01J 37/0244* (2013.01); *B01J 37/0246* (2013.01); *B01J 37/038* (2013.01); *B01J 37/08* (2013.01); *B01D 2255/2065* (2013.01); *B01D 2255/2073* (2013.01); *B01D 2255/2092* (2013.01); *B01D 2255/20715* (2013.01); *B01D 2255/20738* (2013.01); *B01D 2255/20761* (2013.01); *B01D 2255/407* (2013.01); *B01D 2255/502* (2013.01); *B01D 2255/65* (2013.01); *B01D 2255/9022* (2013.01); *B01D 2255/9032* (2013.01); *B01D 2257/406* (2013.01)

(58) Field of Classification Search
CPC ................ B01J 23/8892; B01J 29/7215; B01J 35/0006; B01J 37/0244; B01J 37/08
USPC ........................................................ 423/237
See application file for complete search history.

(56) References Cited

U.S. PATENT DOCUMENTS

| | | | |
|---|---|---|---|
| 7,373,511 B2 | 7/2008 | Tran et al. | |
| 7,410,626 B2 | 8/2008 | Tran et al. | |
| 8,202,481 B2 | 6/2012 | Nochi et al. | |
| 8,226,896 B2* | 7/2012 | Pfeifer | B01D 53/9468 422/171 |
| 8,524,185 B2 | 9/2013 | Caudle et al. | |
| 8,617,473 B2* | 12/2013 | deRuyter | B01D 53/8631 422/169 |
| 8,765,067 B1 | 7/2014 | Kadono et al. | |
| 9,580,309 B2 | 2/2017 | Araki et al. | |
| 2005/0069477 A1 | 3/2005 | Hong et al. | |
| 2007/0021294 A1 | 1/2007 | Hori et al. | |
| 2008/0112870 A1* | 5/2008 | Moini | B01D 53/8628 423/237 |
| 2008/0167178 A1 | 7/2008 | Malyala et al. | |
| 2009/0209408 A1 | 8/2009 | Kitamura et al. | |
| 2010/0058746 A1 | 3/2010 | Pfeifer et al. | |
| 2010/0111796 A1 | 5/2010 | Caudle et al. | |
| 2010/0266473 A1* | 10/2010 | Chen | B01D 53/864 423/245.1 |
| 2011/0258992 A1 | 10/2011 | Gonze et al. | |
| 2012/0042631 A1 | 2/2012 | Schmieg et al. | |
| 2013/0156687 A1* | 6/2013 | Araki | B01J 23/002 423/658.2 |

FOREIGN PATENT DOCUMENTS

| | | |
|---|---|---|
| JP | 2010510049 A | 4/2010 |
| JP | 2012507662 A | 3/2012 |
| RU | 2449135 C2 | 4/2012 |
| WO | 2004027226 A2 | 4/2004 |
| WO | 2010123731 A1 | 10/2010 |
| WO | 2012160391 A1 | 11/2012 |

* cited by examiner

Figure 2: NH$_3$ Conversion in the Ammonia Slip Catalyst Zone

Figure 3: CO Conversion in the Ammonia Slip Catalyst Zone

Figure 4: Total System $NH_3$ + $NO_x$ Output

NON-PGM AMMONIA SLIP CATALYST

CROSS-REFERENCE TO RELATED APPLICATIONS

This application claims priority to U.S. Provisional Application No. 62/007,608, filed on Jun. 4, 2014, and is incorporated herein by reference.

FIELD OF THE INVENTION

The present invention is directed towards catalysts and methods for removal of ammonia from flue gases that have been subjected to selective catalytic reduction (SCR) of oxides of nitrogen (NOx) by ammonia injection. More specifically, the present invention is directed to a composite catalyst having a layer comprising an SCR catalyst and a layer comprising an oxidation catalyst, where the oxidation catalyst comprises at least two metals chosen from specific groups, and the layer comprising the oxidation catalyst does not contain a platinum group metal (PGM).

BACKGROUND OF THE INVENTION

Combustion of hydrocarbon-based fuel in electrical power stations and in engines produces flue or exhaust gas that contains, in large part, relatively benign nitrogen ($N_2$), water vapor ($H_2O$), and carbon dioxide ($CO_2$). But the flue and exhaust gases also contains, in relatively small part, noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of flue and exhaust gas released into the atmosphere, it is desirable to eliminate or reduce the amount of the undesirable components, preferably by a process that, in turn, does not generate other noxious or toxic substances.

Typically, flue gases from electrical power stations and exhaust gases lean burn gas engines have a net oxidizing effect due to the high proportion of oxygen that is provided to ensure adequate combustion of the hydrocarbon fuel. In such gases, one of the most burdensome components to remove is $NO_x$, which includes nitric oxide (NO), nitrogen dioxide ($NO_2$), and nitrous oxide ($N_2O$). The reduction of $NO_x$ to $N_2$ is particularly problematic because the exhaust gas contains enough oxygen to favor oxidative reactions instead of reduction. Notwithstanding, $NO_x$ can be reduced by a process commonly known as Selective Catalytic Reduction (SCR). An SCR process involves the conversion of $NO_x$, in the presence of a catalyst and with the aid of a nitrogenous reducing agent, such as ammonia, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the $NO_x$ reduction reaction takes place as the gases pass through or over the catalyzed substrate. The chemical equation for stoichiometric SCR reactions using ammonia is:

$$4NO+4NH_3+O_2 \rightarrow 4N_2+6H_2O$$

$$2NO_2+4NH_3+O_2 \rightarrow 3N_2+6H_2O$$

$$NO+NO_2+2NH_3 \rightarrow 2N_2+3H_2O$$

Most SCR processes utilize a stoichiometric excess of ammonia in order to maximize the conversion of NOx. Unreacted ammonia that passes through the SCR process (also referred to as "ammonia slip") is undesirable, because the released ammonia gas can negatively impact the atmosphere and can react with other combustion species. To reduce ammonia slip, SCR systems can include an ammonia oxidation catalyst (AMOX) (also known as an ammonia slip catalyst (ASC)) downstream of the SCR catalyst.

Catalysts for oxidizing excess ammonia in an exhaust gas are known. For example, U.S. Pat. No. 7,393,511 describes an ammonia oxidation catalyst containing a precious metal, such as platinum, palladium, rhodium, or gold on a support of titania alumina, silica, zirconia, etc. Other ammonia oxidation catalyst contain a first layer of vanadium oxide, tungsten oxide, and molybdenum oxide on a titania support, and a second layer of platinum on a titania support (see, e.g., U.S. Pat. No. 8,202,481 and U.S. Pat. No. 7,410,626). However, these catalysts are not highly efficient at converting ammonia, particularly at relatively low temperatures. Most of the known systems for oxidizing excess ammonia rely of expensive precious metals as a component in the oxidation catalyst. Accordingly, there remains a need in the art for improved ammonia slip catalysts. The present invention satisfies this need among others.

SUMMARY OF THE INVENTION

In one aspect of the invention, an ammonia slip catalyst comprises an SCR catalyst and an oxidation catalyst, where the oxidation catalyst comprises at least one first metal selected from the group consisting of copper (Cu), iron (Fe), cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), and the ammonia slip catalyst does not comprise a platinum group metal. The SCR catalyst and the oxidation catalyst can be present on a support as a mixture or in layers.

In another aspect of the invention, a dual layer ammonia slip catalyst can comprise a layer comprising an SCR catalyst and a layer comprising an oxidation catalyst, where the oxidation catalyst comprises at least one first metal selected from the group consisting of copper (Cu), iron (Fe), cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), and the ammonia slip catalyst does not comprise a platinum group metal. The layer comprising the SCR catalyst, also called the SCR layer, and the layer comprising the oxidation catalyst, also called the oxidation layer, can be provided in various configurations, either on the same substrate or on different substrates.

In yet another aspect of the invention, a method for producing an ammonia slip catalyst comprises: (a) forming a washcoat comprising a mixture of the SCR catalyst and an oxidation catalyst comprising at least one first metal selected from the group consisting of copper (Cu), iron (Fe), cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), and the ammonia slip catalyst does not comprise a platinum group metal; (b) applying the washcoat to a substrate; (c) drying the washcoat on the substrate; and (d) calcining the washcoat on the substrate.

In still another aspect of the invention, a method for producing a dual layer ammonia slip catalyst comprises: (a) forming a oxidation layer on a substrate by applying onto a substrate a oxidation layer washcoat comprising an oxidation catalyst comprising at least one first metal selected from the group consisting of copper (Cu), iron (Fe), cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), where the ammonia slip catalyst does not comprise a platinum group metal, (b) drying the oxidation layer washcoat on the substrate, (c) calcining the oxidation layer washcoat on the substrate, (d) forming an SCR layer positioned over the oxidation layer by applying an SCR layer washcoat comprising an SCR catalyst over the calcined oxidation layer on a substrate formed in step (c), (e) drying the SCR layer washcoat on the calcined oxidation layer on a substrate and (f) calcining the SCR layer washcoat on the calcined oxidation layer washcoat on the substrate.

In yet another aspect of the invention, a method for producing a dual layer ammonia slip catalyst comprises (a) forming an oxidation layer on a substrate by placing on the substrate an oxidation layer washcoat comprising at least one first metal selected from the group consisting of copper (Cu), iron (Fe), cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), and the ammonia slip catalyst does not comprise a platinum group metal, (b) drying the oxidation layer washcoat on the substrate, (c) forming an SCR layer positioned over the oxidation layer by applying an SCR washcoat comprising an SCR catalyst over the oxidation layer on a substrate formed in step (b), (d) drying the SCR layer washcoat on the calcined oxidation layer on the substrate and (e) calcining the oxidation layer washcoat and the SCR layer washcoat on the substrate.

In another aspect of the invention, a method for producing a dual layer ammonia slip catalyst comprises (a) forming an SCR layer of an SCR catalyst on a substrate by applying onto a portion of a substrate a washcoat comprising an SCR catalyst; (b) drying the SCR washcoat layer on the substrate; (c) optionally calcining the SCR washcoat layer on the substrate; (d) forming an oxidation layer of an oxidation catalyst comprising at least one first metal selected from the group consisting of copper (Cu), iron (Fe), cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), and the ammonia slip catalyst does not comprise a platinum group metal, onto a portion of the substrate by applying onto a portion of a substrate a oxidation washcoat comprising the oxidation catalyst; (e) drying the oxidation layer on the substrate; and (f) calcining at least the oxidation catalyst on the substrate.

In still another aspect of the invention, methods for reducing the concentration of ammonia in a flue gas stream generated by a combustion source comprise contacting a flue gas stream containing ammonia with the ammonia slip catalyst or a dual layer ammonia slip catalyst as described herein.

BRIEF DESCRIPTION OF THE DRAWINGS

The invention may be understood from the following detailed description when read in connection with the accompanying drawing.

DETAILED DESCRIPTION OF THE INVENTION

As used in this specification and the appended claims, the singular forms "a", "an" and "the" include plural referents unless the context clearly indicates otherwise. Thus, for example, reference to "a catalyst" includes a mixture of two or more catalysts, and the like.

As used herein, the term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

As used herein, the term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

The term "platinum group metal" or PGM, means ruthenium, rhodium, palladium, osmium, iridium, and platinum. The phrase "does not comprise a platinum group metal" means that a platinum group metal is not added in forming the catalyst but does not preclude one or more platinum group metals being present in trace amounts, which are levels that do not have measurable catalytic activity.

In one aspect of the invention, an ammonia slip catalyst comprises a mixture of an SCR catalyst and an oxidation catalyst, where the oxidation catalyst comprises at least one first metal selected from the group consisting of copper (Cu), iron (Fe), cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), and the ammonia slip catalyst does not comprise a platinum group metal.

In another aspect of the invention, a dual layer ammonia slip catalyst comprises an SCR layer comprising an SCR catalyst and an oxidation layer an oxidation catalyst comprising at least one first metal selected from the group consisting of copper (Cu), iron (Fe), cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), and the oxidation layer does not comprise a platinum group metal. The layer comprising the SCR catalyst, also called the SCR layer, and the layer comprising the oxidation catalyst, also called the oxidation layer, can be provided in various configurations, either on the same substrate or on different substrates.

SCR Catalyst

The SCR catalyst can be an oxide of a base metal, a molecular sieve, a metal exchanged molecular sieve or a mixture thereof. The base metal can be selected from the group consisting of vanadium (V), molybdenum (Mo) and tungsten (W), chromium (Cr), cerium (Ce), manganese (Mn), iron (Fe), cobalt (Co), nickel (Ni), and copper (Cu), and mixtures thereof. SCR compositions consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, of which the entire contents are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. These catalysts may contain other inorganic materials such as $SiO_2$ and $ZrO_2$ acting as binders and promoters.

When the SCR catalyst is a base metal, the catalyst article can further comprise at least one base metal promoter. As used herein, a "promoter" is understood to mean a substance that when added into a catalyst, increases the activity of the catalyst. The base metal promoter can be in the form of a metal, an oxide of the metal, or a mixture thereof. The at least one base metal catalyst promoter may be selected from neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof. The at least one base metal catalyst promoter can preferably be $MnO_2$, $Mn_2O_3$, $Fe_2O_3$, $SnO_2$, CuO, CoO, $CeO_2$ and mixtures thereof. The at least one base metal catalyst promoter may be added to the catalyst in the form of a salt in an aqueous solution, such as a nitrate or an acetate. The at least one base metal catalyst promoter and at least one base metal catalyst, e.g., copper, may be impregnated from an aqueous solution onto the oxide support material(s), may be added into a washcoat comprising the oxide support material(s), or may be impregnated into a support previously coated with the washcoat. The SCR catalyst can contain from at least about 0.1 weight percent, at least about 0.5 weight percent, at least about 1 weight percent, or at least about 2 weight percent to at most about 10 weight percent, about 7 weight percent, about 5 weight percent of a promoter metal based on the total weight of the promoter metal and support.

The SCR catalyst can comprises a molecular sieve or a metal exchanged molecular sieve. As is used herein "molecular sieve" is understood to mean a metastable material containing tiny pores of a precise and uniform size that may be used as an adsorbent for gases or liquids. The molecules which are small enough to pass through the pores are adsorbed while the larger molecules are not. The molecular sieve can be a zeolitic molecular sieve, a non-zeolitic molecular sieve, or a mixture thereof.

A zeolitic molecular sieve is a microporous aluminosilicate having any one of the framework structures listed in the Database of Zeolite Structures published by the International Zeolite Association (IZA). The framework structures include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5. Aluminosilicate zeolites can have a silica/alumina molar ratio (SAR) defined as $SiO_2/Al_2O_3$) from at least about 5, preferably at least about 20, with useful ranges of from about 10 to 200.

As used herein, the term "non zeolitic molecular sieve" refers to corner sharing tetrahedral frameworks where at least a portion of the tetrahedral sites are occupied by an element other than silicon or aluminum. Specific non-limiting examples of non-zeolitic molecular sieves include silicoaluminophosphates such as SAPO-34, SAPO-37 and SAPO-44. The silicoaluminophosphates can have framework structures that contain framework elements that are found in zeolites, such as CHA, FAU, BEA, MFI, MOR and other types described below.

The SCR catalyst can comprise a small pore, a medium pore or a large pore molecular sieve, or combinations thereof.

The SCR catalyst can comprise a small pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof. The SCR catalyst can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof. Preferably the small pore molecular sieve is selected from the group of Framework Types consisting of CHA, LEV, AEI, AFX, ERI, SFW, KFI, DDR and ITE.

The SCR catalyst comprises can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore molecular sieve selected from the group of Framework Types consisting of MFI, FER and STT.

The SCR catalyst can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of MOR, OFF and BEA.

A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zerovalent metal atoms or clusters, isolated cations, mononuclear or polynuclear oxycations, or as extended metal oxides. Preferably, the metals can be iron, copper, and mixtures or combinations thereof.

The metal can be combined with the zeolite using a mixture or a solution of the metal precursor in a suitable solvent. The term "metal precursor" means any compound or complex that can be dispersed on the zeolite to give a catalytically-active metal component. Preferably the solvent is water due to both economics and environmental aspects of using other solvents. When copper, a preferred metal is used, suitable complexes or compounds include, but are not limited to, anhydrous and hydrated copper sulfate, copper nitrate, copper acetate, copper acetylacetonate, copper oxide, copper hydroxide, and salts of copper ammines (e.g. $[Cu(NH_3)_4]^{2+}$). This invention is not restricted to metal precursors of a particular type, composition, or purity. The molecular sieve can be added to the solution of the metal component to form a suspension, which is then allowed to react so that the metal component is distributed on the zeolite. The metal can be distributed in the pore channels as well as on the outer surface of the molecular sieve. The metal can be distributed in ionic form or as a metal oxide. For example, copper may be distributed as copper (II) ions, copper (I) ions, or as copper oxide. The molecular sieve containing the metal can be separated from the liquid phase of the suspension, washed, and dried. The resulting metal-containing molecular sieve can then be calcined to fix the metal in the molecular sieve.

A metal exchanged molecular sieve can contain in the range of about 0.10% and about 10% by weight of a group VB, VIB, VIM, VIIIB, IB, or IIB metal located on extra framework sites on the external surface or within the channels, cavities, or cages of the molecular sieve. Preferably, the extra framework metal can be present in an amount of in the range of about 0.2% and about 5% by weight.

The metal exchanged molecular sieve can be a copper (Cu) supported small pore molecular sieve having from about 0.1 to about 20.0 wt. % copper of the total weight of the catalyst. Preferably copper is present from a about 1 wt. % to about 6 wt. % of the total weight of the catalyst, more preferably from about 1.8 wt. % to about 4.2 wt. % of the total weight of the catalyst.

The metal exchanged molecular sieve can be an iron (Fe) supported small pore molecular sieve having from about 0.1 to about 20.0 wt. % iron of the total weight of the catalyst. Preferably iron is present from about 1 wt. % to about 6 wt. % of the total weight of the catalyst, more preferably from about 1.8 wt. % to about 4.2 wt. % of the total weight of the catalyst.

Oxidation Catalyst

The oxidation catalyst comprises at least one first metal selected from the group consisting of copper (Cu), iron (Fe), cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), and ammonia slip catalyst does not comprise a platinum group metal.

Each of the at least one first metal and second metal can be in the form of a salt, preferably a nitrate, sulfate, chloride or an acetate, an oxide, or a compound containing the metal where the compound containing the metal forms an oxide of the metal upon calcination. Preferably the first metal is Cu and the second metal is Mn.

A layer comprising an oxidation catalyst can further comprise an oxide support material comprising alumina ($Al_2O_3$), silica ($SiO_2$) zirconia ($ZrO_2$), ceria ($CeO_2$) and titania ($TiO_2$), or mixtures thereof. The oxide support material can further comprise other oxide materials such as perovskites, nickel oxide (NiO), manganese dioxide ($MnO_2$), praseodymium (III) oxide ($Pr_2O_3$). The oxide support material can include composite oxides or mixed oxides of two or more thereof (such as $CeZrO_2$ mixed oxides, $TiZrO_2$ mixed oxides, $TiSiO_2$ mixed oxides, and $TiAlO_x$ oxides where x is dependent on the ratio of $TiO_2$ to $Al_2O_3$.). The oxide support material, in addition for serving as a support may also serve as a binder. For example, alumina may act as both a support and a binder in an alumina and $CeZrO_2$ mixed oxide. The second layer can comprise an oxide support material comprising one or more of a stabilized alumina, silica, zirconia, ceria, and titania. Stabilizers may be selected from zirconium (Zr), lanthanum (La), aluminum (Al), yttrium (Y), praseodymium (Pr), neodymium (Nd), an oxide thereof, a composite oxide or mixed oxide of any two or more thereof, or at least one alkaline earth metal, e.g., barium (Ba). If each oxide support material is stabilized, the stabilizers may be the same or different. The oxide support material can be $Al_2O_3$ and $CeO_2$. Where the oxide support material is $Al_2O_3$, it may be alpha-, gamma-, beta-, delta-, or theta-$Al_2O_3$, for example. The support material can be in the form of mixed oxides or stabilized mixed oxides. The metal oxides in mixed oxides are present in the form of a single phase, while stabilized mixed oxides are present in two phases. Preferably a layer comprising the oxidation catalyst comprises Cu and Mn, as the first and second metals, alumina and either $CeO_2/ZrO_2$ or a Zr-stabilized $CeO_2$ mixed oxide. The Zr-stabilized $CeO_2$ mixed oxide can comprise Ce and Zr in about a 1:1 mole ratio. The oxide support material can be La-stabilized $Al_2O_3$ and Zr-stabilized $CeO_2$. The oxide support material in the second layer can comprise about 20 mole % La-stabilized $Al_2O_3$ and about 80 mole % Zr-stabilized $CeO_2$.

Substrate

The term "substrate" refers to substantially inert substrate material, as generally known in the art. The substrate may be of any generally suitable form. For example, the substrate may comprise a flow through monolith, such as a ceramic or honeycomb structure, or the substrate may be in the form of foams, or the substrate may be in the form of pellets, fluidized bed particulates, or may comprise particles such as spheres or short extruded segments.

The solid substrate may be any of those materials typically used for preparing exhaust gas treatment catalysts and will preferably comprise a metal or refractory ceramic having a honeycomb structure. Any suitable substrate may be employed, such as a monolithic substrate of the type having a plurality of fine, parallel gas flow passages extending there through from an inlet or an outlet face of the carrier, such that passages are open to fluid flow there through. The passages that are essentially straight paths from their fluid inlet to their fluid outlet are defined by walls on which the ammonia oxidation catalyst is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

Honeycomb substrates comprise multiple adjacent, parallel channels that generally extend from the inlet face to the outlet face of the substrate and are either open on both ends (flow-through substrates) or are capped on alternating ends in a checker-board type pattern (wall-flow filters). This geometry results in a high-surface area-to-volume ratio. Honeycomb configurations are more compact than plate types, but have higher pressure drops and plug more easily. However, for most mobile applications, preferred substrates are honeycombs. For certain applications, the honeycomb flow though monolith has a high cell density, for example about 600 to about 800 cells per square inch, and/or an average internal wall thickness of about 0.18-0.35 mm, preferably about 0.20-0.25 mm. For certain other applications, the honeycomb flow through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite e.g. acicular mullite, pollucite, a thermet such as $Al_2OsZFe$, $Al_2O_3$/Ni or $B_4CZFe$, or composites comprising segments of any two or more thereof. Preferred materials include cordierite, silicon carbide, and alumina titanate. In certain embodiments, the substrate is inert.

The substrate wall of a honeycomb preferably has a porosity and pore size that is conducive for washcoating. Porosity is a measure of the percentage of void space in a porous substrate. Preferably, the porous substrate has a porosity of about 30 to about 80%, for example about 40 to about 75%, about 40 to about 65%, or from about 50 to about 60%. The pore interconnectivity, measured as a percentage of the substrate's total void volume, is the degree to which pores, void, and/or channels, are joined to form continuous paths through a porous substrate, i.e., from the inlet face to the outlet face of a filter. Preferably, the porous substrate has a pore interconnectivity volume of at least about 30%, more preferably at least about 40%.

Mean pore size of the substrate wall can be determined by any acceptable means, including by mercury porosimetry. Preferred porous substrates have a mean pore size of about 10 to about 40 μm, for example about 20 to about 30 μm, about 10 to about 25 μm, about 10 to about 20 μm, about 20 to about 25 μm, about 10 to about 15 μm, and about 15 to about 20 μm.

Washcoat

The term "washcoat" is a term widely recognized in the art and refers to mixture of one or more a catalyst or a catalysts precursor, support materials, and optionally other materials such as binders, promoters or stabilizers.

The catalysts of the present invention can be utilized in heterogeneous catalytic reaction systems (i.e., solid catalyst in contact with a gas reactant). To improve contact surface area, mechanical stability, and fluid flow characteristics, the catalyst components can be disposed on and/or within a substrate, for example as a coating. In certain embodiments, a washcoat containing one or more of the catalyst components is applied as a coating to an inert substrate, such as corrugated metal plate or a honeycomb cordierite brick. The washcoat is preferably a solution, suspension, or slurry. Suitable coatings include surface coatings that cover a portion or the entire substrate, coatings that penetrate a portion of the substrate, coatings that permeate the substrate, or some combination thereof. In addition to the catalyst component, a washcoat can also include components, such as fillers, binders, stabilizers, rheology modifiers, and other additives, including one or more of alumina, silica, non-zeolite silica alumina, titania, zirconia, ceria. In certain embodiments, the washcoat comprises pore-forming agents such as graphite, cellulose, starch, polyacrylate, and polyethylene, and the like. These additional components do not necessarily catalyze the desired reaction, but instead improve the catalytic material's effectiveness, for example by increasing its operating temperature range, increasing contact surface area of the catalyst, increasing adherence of the catalyst to a substrate, modifying rheology for better processing, etc. Typically, metal oxide particles used as binders are distinguishable over metal oxide particles used as supports based on particle size, with the binder particles being significantly larger relative to support particles.

A variety of deposition methods are known in the art for depositing the catalyst on the substrate. Methods for depositing the catalyst on the substrate include, for example, disposing the catalyst in a liquid vehicle to form a slurry and wetting the substrate with the slurry by dipping the substrate into the slurry, spraying the slurry onto the substrate, etc. A washcoat is typically applied to a substrate as a water-based slurry. Typically, the slurry will contain a total water content of at least 20 wt. %. Water contents of at least 30 wt. %, at least 40 wt. %, at least 50 wt. % or at least 60 wt. %, are also exemplified. The slurry coated substrate can be dried and calcined (thermally treated in presence of air or oxygen) prior to use. The temperatures and times used in calcination depend upon the components in the material to be calcined and generally are between about 400° C. to about 900° C. In applications involving the processes described herein, calcinations are generally performed at temperatures from about 500° C. to about 550° C. for about 2 to about 6 hours.

The support for the oxidation catalyst can be kneaded along with other components such as fillers, binders, and reinforcing agents, into an extrudable paste which is then extruded through a die to form a honeycomb brick. Before or after the honeycomb brick is dried and/or calcined, the metal components of the oxidation catalyst are added to either one or more portions of the brick or to the entire brick in order to form the oxidation catalyst. In other embodiments, the oxidation catalyst containing the supported metals can be incorporated into the extrudable paste prior to extrusion. The SCR catalyst can then be applied as a coating on the extruded brick containing the oxidation catalyst. Two substrate designs useful in the present invention are plate and honeycomb. Plate-type catalysts have relative lower pressure drops and are less susceptible to plugging and fouling than the honeycomb types, but plate configurations are much larger and more expensive. The plates are typically constructed of metal or corrugated metal.

In certain embodiments, the washcoat or impregnation loading on and/or within the substrate for each layer or for the combination of two or more layers is 0.1 to 8 $g/in^3$, more preferably 0.5 to 6 $g/in^3$, and even more preferably 1 to 4 $g/in^3$. In certain embodiments, the washcoat or impregnation loading on and/or within the substrate for each layer or for the combination of two or more layers is >1.00 $g/in^3$, such as >1.2 $g/in^3$, >1.5 $g/in^3$, >1.7 $g/in^3$ or >2.00 $g/in^3$ or for example 1.5 to 2.5 $g/in^3$.

Configurations of SCR and Oxidation Catalysts

The SCR catalyst and the oxidation catalyst can be present in a variety of configurations, such as a mixture of the SCR catalyst and the oxidation catalyst, an overlayer of an SCR catalyst on an underlayer of the oxidation catalyst that is placed in, or on, a substrate, or a sequential placement along the flow of an exhaust gas of the SCR catalyst and the oxidation catalyst, where the oxidation catalyst is downstream of the SCR catalyst.

Figure 1A:
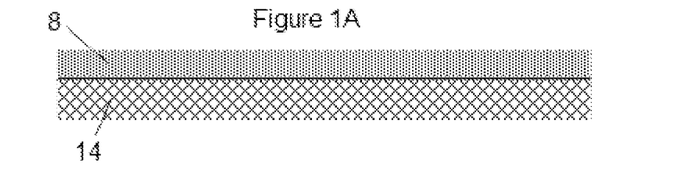
FIGS. 1A-1L are drawings of configurations of catalyst articles showing locations of the SCR catalyst and the oxidations catalyst.

FIG. 1A shows a configuration in which the SCR catalyst and the oxidation catalyst are present in a single layer 8 on the substrate 14.

Figure 1B:
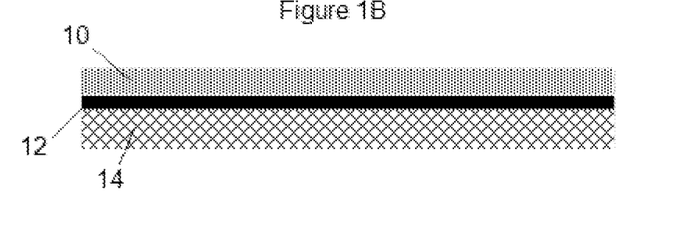
Figure 1C:
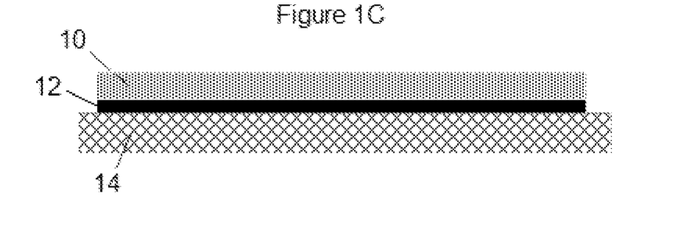
Figure 1D:
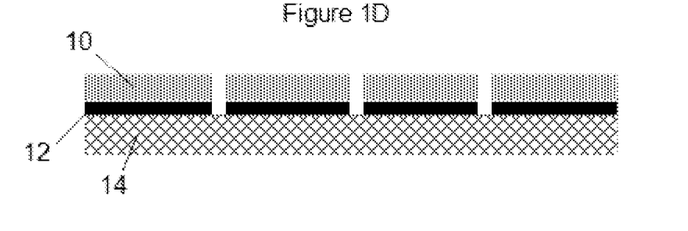
Figure 1E:
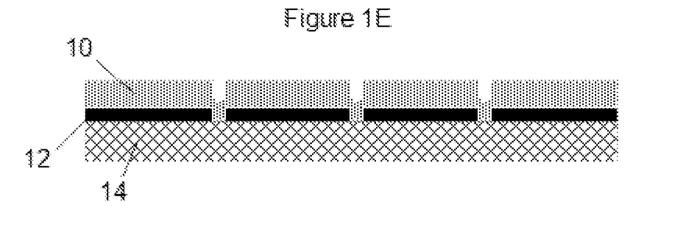
Figure 1F:
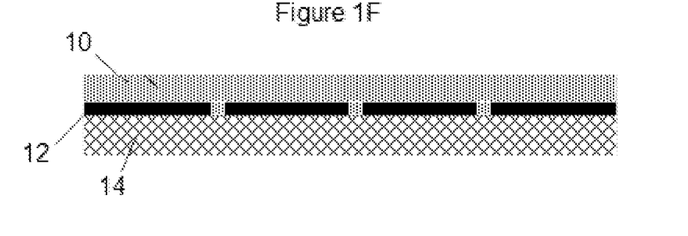
Figure 1G:
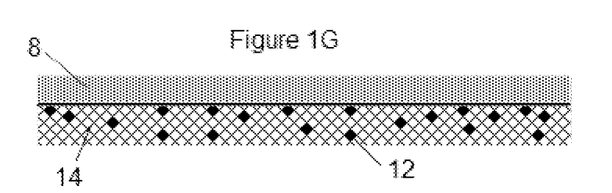

FIG. 1B shows a configuration in which the SCR layer 10 comprising the SCR catalyst is positioned over the oxidation layer 12 comprising the oxidation catalyst, and the oxidation layer 12 is positioned over the solid substrate. In FIG. 1B, both the SCR layer and the oxidation layer are positioned over the entire axial length of the substrate. The SCR layer and the oxidation layer can be positioned over a portion of the axial length of the substrate, as shown in FIGS. 1C and 1D. In placing the SCR layer over the oxidation layer, a portion of the SCR washcoat can occupy some or all of the space between adjacent oxidation layers. FIG. 1E shows where all of the space between adjacent oxidation layers comprises an SCR catalyst. The space between adjacent oxidation layers can be completely filed with an SCR overlay that also fills the space between the oxidation layers, as shown in FIG. 1F. Generally, a catalyst layer of the present invention permeates the substrate; penetrates a portion of the substrate, for example a majority portion; coats the surface of the substrate; or a combination thereof. Alternatively to being coated on a substrate wall, the oxidation catalyst can be incorporated into a high porosity substrate, for example as an interior coating that permeates the wall or can be incorporated into extrudable paste which forms the substrate. FIG. 1G shows a configuration in which the SCR catalyst is present in a layer over the substrate 14 and the oxidation catalyst is present in the substrate 14. One or more of the catalysts layers can cover only a portion of the substrate. For example a catalyst layer can be applied to about 10 percent of the length of the substrate, from the front of the substrate 46 or the rear of the substrate 48, relative to the overall direction of exhaust gas flow 50 through the substrate. The oxidation catalyst layer can be coated on a portion at the rear of the substrate 48. The catalyst layers can cover about 25 percent, about 50 percent, or about 75 percent of the substrate, preferably from the rear 48 or front 46 of the substrate. The catalyst coatings may be applied to the same or different portions of the substrate, but preferably the SCR catalyst layer completely covers the oxidation catalyst layer so that all exhaust gas being treated by the catalyst layers will first pass through the SCR layer before reaching the oxidation catalyst layer.

Figure 1H:
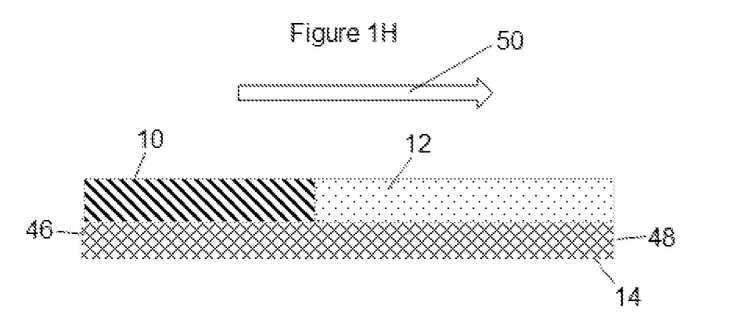

The SCR layer and the oxidation layer can be placed next to each other sequentially in the direction of exhaust gas flow. As used herein, the term "sequential" with respect to the layers means that each layer is contact with a substrate and that the layers as a whole are arranged next to one another on one or more substrates. FIG. 1H shows a sequential positioning of an SCR layer 10 comprising an SCR catalyst and an oxidation layer 12 comprising an oxidation catalyst on a solid support 14. The exhaust gas has a generalized flow in the direction of the arrow, from left to right. The support has a front end 46 and a back end 48.

Figure 1I:
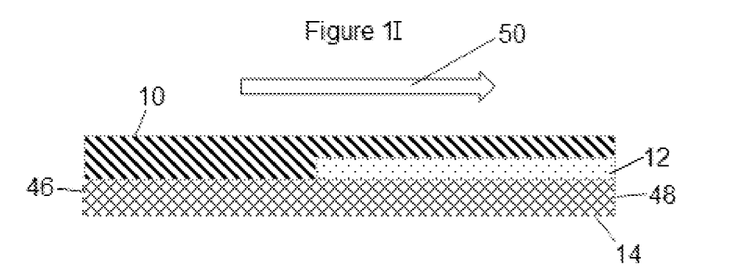
Figure 1J:
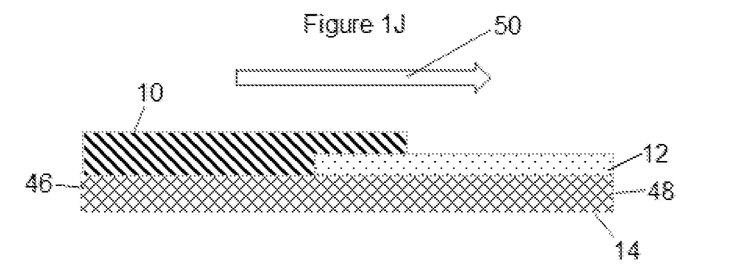

FIG. 11 shows a sequential positioning of an SCR layer 10 comprising an SCR catalyst and an oxidation layer 12 comprising an oxidation catalyst on a solid support 14. Part of the SCR layer 10 also is an overlayer over the oxidation layer 12. The overlayer can be located over the entire oxidation layer, as shown in FIG. 1I, or over a portion of the oxidation layer, as shown in FIG. 1J.

Figure 1K:
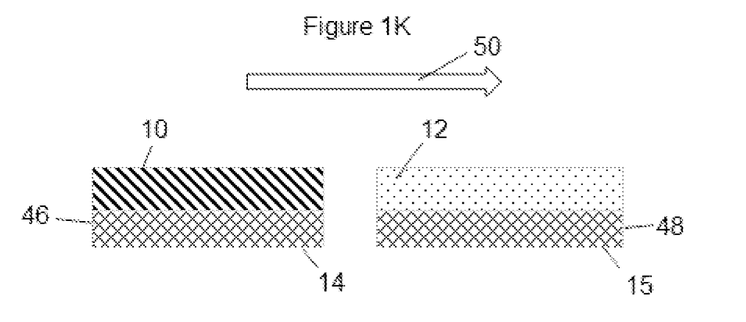
Figure 1L:
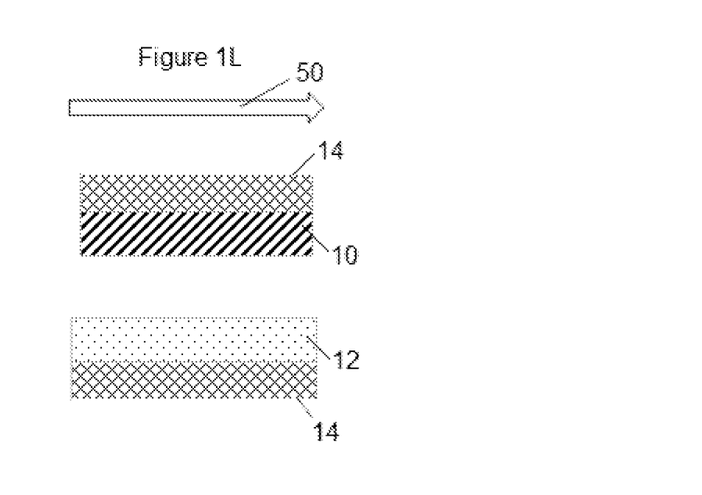

The SCR layer and the oxidation layer may be present on two different supports. An SCR layer 10 comprising the SCR catalyst can be placed on a support 14 with an adjacent, downstream support 15 having an oxidation layer 12 comprising the oxidation catalyst on the support is shown in FIG. 1K. An SCR layer 10 comprising the SCR catalyst can be placed on a support 14 with an opposite support 15 having an oxidation layer 12 comprising the oxidation catalyst on the support, as shown in FIG. 1L.

Preferably, the oxidation layer 12 and the SCR layer 10 are physically distinct and separate, but consecutive layers. The term "consecutive layers" is used to describe the relative positions of catalyst layers in the catalyst article with respect to the normal direction of exhaust gas flow through, past, and/or over the catalyst article. Under normal exhaust gas flow conditions, exhaust gas contacts and at least partially penetrates the second layer before contacting the first layer, and subsequently returns through the second layer to exit the catalyst component.

Importantly, the SCR catalyst is disposed over and/or upstream of the oxidation catalyst layer. The SCR layer preferably covers the entire oxidation catalyst layer to prevent untreated secondary NOx formed via ammonia oxidation in the oxidation layer from exiting the system without contacting the SCR catalyst In another aspect of the invention, a method of manufacturing an ammonia slip catalyst comprises: (a) forming an layer on a substrate by applying onto the substrate a washcoat comprising an SCR catalyst and an oxidation catalyst comprising at least one first metal selected from the group consisting of copper (Cu), iron (Fe), cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), where the washcoat does not comprise a platinum group metal, (b) drying the washcoat on the substrate, and (c) calcining the washcoat on the substrate. Each of the at least one first metal and second metal can may be present in the oxidation layer washcoat in the form of a salt, preferably a nitrate, sulfate, chloride or an acetate, an oxide, or a compound containing the metal where the compound containing the metal forms an oxide of the metal upon calcination. Preferably the first metal is Cu and the second metal is Mn. The washcoat can further comprise an oxide support material comprising alumina ($Al_2O_3$), silica ($SiO_2$) zirconia ($ZrO_2$), ceria ($CeO_2$), and titania ($TiO_2$), or mixtures thereof. The washcoat can further comprise other oxide materials such as perovskites, nickel oxide (NiO), manganese dioxide ($MnO_2$), praseodymium (III) oxide ($Pr_2O_3$). The oxide support material can include composite oxides or mixed oxides of two or more thereof (such as $CeZrO_2$ mixed oxides, $TiZrO_2$ mixed oxides, $TiSiO_2$ mixed oxides, and $TiAlO_x$ oxides where x is dependent on the ratio of $TiO_2$ to $Al_2O_3$.). The oxide support material, in addition for serving as a support, may also serve as a binder. For example, alumina may act as both a support and a binder in an alumina and $CeZrO_2$ mixed oxide. The oxidation layer washcoat can comprise an oxide support material comprising one or more of a stabilized alumina, silica, zirconia, ceria, and titania. Stabilizers may be selected from zirconium (Zr), lanthanum (La), aluminum (Al), yttrium (Y), praseodymium (Pr), neodymium (Nd), an oxide thereof, a composite oxide or mixed oxide of any two or more thereof, or at least one alkaline earth metal, e.g., barium (Ba). If each oxide support material is stabilized, the stabilizers may be the same or different. The oxide support material can be $Al_2O_3$ and $CeO_2$. Where the oxide support material is $Al_2O_3$, it may be alpha-, gamma-, beta-, delta-, or theta-$Al_2O_3$, for example. The support material can be in the form of mixed oxides or stabilized mixed oxides. The metal oxides in mixed oxides are present in the form of a single phase, while stabilized mixed oxides are present in two phases. Preferably the washcoat comprises Cu and Mn, as the first and second metals, alumina and either $CeO_2/ZrO_2$ or a Zr-stabilized $CeO_2$ mixed oxide. The Zr-stabilized $CeO_2$ mixed oxide can comprise Ce and Zr in about a 1:1 mole ratio. The oxide support material can be La-stabilized $Al_2O_3$ and Zr-stabilized $CeO_2$. The oxide support material in the oxidation washcoat can comprise about 20 mole % La-stabilized $Al_2O_3$ and about 80 mole % Zr-stabilized $CeO_2$. The washcoat can comprise a molecular sieve selected from the group consisting of MOR (mordenite), FER (ferrierite), FAU (zeolite Y), MFI (ZSM-5), BEA (beta zeolites), Fe-BEA, CHA (Chabazite), Cu-CHA and a silicoaluminophosphate comprising a structurally similar framework. The washcoat can preferably comprise a Fe-BEA or a Cu-CHA zeolite catalyst or a silicoaluminophosphate comprising a structurally similar framework. Preferably, the washcoat can comprise a Fe-BEA or a Cu-CHA zeolite catalyst or a silicoaluminophosphate comprising a structurally similar framework and further comprises Cu and Mn. The oxidation catalyst in the washcoat can be present at a concentration of 0.3 to 1.5 g per $in^3$, based on the total weight of metal in the catalyst. The SCR catalyst in the washcoat can be present at a concentration of 0.5 to 2.5 g per $in^3$, based on the total weight of metal in the catalyst. The ratio of the amount of SCR catalyst in the washcoat (in g per $in^3$) to the amount of oxidation catalyst in the washcoat (in g per $in^3$) can be between 0.3 and 8.3.

In another aspect of the invention, a method of manufacturing a dual layer ammonia slip catalyst comprises: (a) forming an oxidation layer on a substrate by applying onto a substrate an oxidation layer washcoat comprising at least one first metal selected from the group consisting of copper (Cu), iron (Fe), cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), where the washcoat does not comprise a platinum group metal, (b) drying the oxidation layer washcoat on the substrate, (c) calcining the oxidation layer washcoat on the substrate; (d) forming an SCR layer positioned over the oxidation layer by applying an SCR layer washcoat comprising a molecular sieve, preferably having a substituted metal and/or an extra framework metal, or a vanadium/titania over the calcined oxidation layer formed in step (c), (e) drying the SCR layer washcoat on the calcined oxidation layer on a substrate, and (f) calcining the SCR layer washcoat on the oxidation layer washcoat on the substrate. Each of the at least one first metal and second metal can may be present in the oxidation layer washcoat in the form of a salt, preferably a nitrate, sulfate, chloride or an acetate, an oxide, or a compound containing the metal where the compound containing the metal forms an oxide of the metal upon calcination. Preferably the first metal is Cu and the second metal is Mn. The oxidation layer washcoat can further comprise an oxide support material comprising alumina ($Al_2O_3$), silica ($SiO_2$) zirconia ($ZrO_2$), ceria ($CeO_2$), and titania ($TiO_2$), or mixtures thereof. The oxide support material can further comprise other oxide materials such as perovskites, nickel oxide (NiO), manganese dioxide ($MnO_2$), praseodymium (III) oxide ($Pr_2O_3$). The oxide support material can include composite oxides or mixed oxides of two or more thereof (such as $CeZrO_2$ mixed oxides, $TiZrO_2$ mixed oxides, $TiSiO_2$ mixed oxides, and $TiAlO_x$ oxides where x is dependent on the ratio of $TiO_2$ to $Al_2O_3$.). The oxide support material, in addition for serving as a support may also serve as a binder. For example, alumina may act as both a support and a binder in an alumina and $CeZrO_2$ mixed oxide. The oxidation layer washcoat can comprise an oxide support material comprising one or more of a stabilized alumina, silica, zirconia, ceria, and titania. Stabilizers may be selected from zirconium (Zr), lanthanum (La), aluminum (Al), yttrium (Y), praseodymium (Pr), neodymium (Nd), an oxide thereof, a composite oxide or mixed oxide of any two or more thereof, or at least one alkaline earth metal, e.g., barium (Ba). If each oxide support material is stabilized, the stabilizers may be the same or different. The oxide support material can be $Al_2O_3$ and $CeO_2$. Where the oxide support material is $Al_2O_3$, it may be alpha-, gamma-, beta-, delta-, or theta-$Al_2O_3$, for example. The support material can be in the form of mixed oxides or stabilized mixed oxides. The metal oxides in mixed oxides are present in the form of a single phase, while stabilized mixed oxides are present in two phases. Preferably the oxidation layer washcoat comprises Cu and Mn, as the first and second metals, alumina and either $CeO_2/ZrO_2$ or a Zr-stabilized $CeO_2$ mixed oxide. The Zr-stabilized $CeO_2$ mixed oxide can comprise Ce and Zr in about a 1:1 mole ratio. The oxide support material can be La-stabilized $Al_2O_3$ and Zr-stabilized $CeO_2$. The oxide support material in the oxidation washcoat can comprise about 20 mole % La-stabilized $Al_2O_3$ and about 80 mole % Zr-stabilized $CeO_2$. The SCR layer washcoat can comprise a molecular sieve selected from the group consisting of MOR (mordenite), FER (ferrierite), FAU (zeolite Y), MFI (ZSM-5), BEA (beta zeolites), Fe-BEA, CHA (Chabazite), Cu-CHA and a silicoaluminophosphate comprising a structurally similar framework. The SCR layer washcoat can preferably comprise a Fe-BEA or a Cu-CHA zeolite catalyst or a silicoaluminophosphate comprising a structurally similar framework. Preferably, the SCR layer washcoat can comprise a Fe-BEA or a Cu-CHA zeolite catalyst and the oxidation layer washcoat can comprise Cu and Mn. The catalyst in the oxidation layer washcoat can be present at a concentration of 0.3 to 1.5 g per in$^3$, based on the total weight of metal in the catalyst. The catalyst in the SCR layer washcoat can be present at a concentration of 0.5 to 2.5 g per in$^3$, based on the total weight of metal in the catalyst. The ratio of the amount of catalyst in the SCR layer washcoat (in g per in$^3$) to the amount of catalyst in the oxidation layer washcoat (in g per in$^3$) can be between 0.3 and 8.3, based on the total weight of metal in each layer of the catalyst.

In yet another aspect of the invention, a method of manufacturing a dual layer ammonia slip catalyst comprises: (a) forming an oxidation layer on a substrate by applying onto a substrate an oxidation layer washcoat comprising at least one first metal selected from the group consisting of copper (Cu), iron (Fe), is cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), where the washcoat does not comprise a platinum group metal, (b) forming a dried oxidation layer washcoat on the substrate, (c) forming an SCR layer positioned over the oxidation layer by applying an SCR layer washcoat comprising a molecular sieve, preferably having a substituted metal and/or an extra framework metal, or a vanadium/titania over the dried oxidation layer formed in step (b), (d) drying the SCR layer washcoat on the calcined oxidation layer on a substrate, and (e) calcining the SCR layer washcoat on the calcined oxidation layer washcoat on the substrate. Each of the at least one first metal and second metal can may be present in the oxidation layer washcoat in the form of a salt, preferably a nitrate, sulfate, chloride or an acetate, an oxide, or a compound containing the metal where the compound containing the metal forms an oxide of the metal upon calcination. Preferably the first metal is Cu and the second metal is Mn. The oxidation layer washcoat can further comprise an oxide support material comprising alumina ($Al_2O_3$), silica ($SiO_2$) zirconia ($ZrO_2$), ceria ($CeO_2$), and titania ($TiO_2$), or mixtures thereof. The oxide support material can further comprise other oxide materials such as perovskites, nickel oxide (NiO), manganese dioxide ($MnO_2$), praseodymium (III) oxide ($Pr_2O_3$). The oxide support material can include composite oxides or mixed oxides of two or more thereof (such as $CeZrO_2$ mixed oxides, $TiZrO_2$ mixed oxides, $TiSiO_2$ mixed oxides, and $TiAlO_x$ oxides where x is dependent on the ratio of $TiO_2$ to $Al_2O_3$.). The oxide support material, in addition for serving as a support may also serve as a binder. For example, alumina may act as both a support and a binder in an alumina and $CeZrO_2$ mixed oxide. The oxidation layer washcoat can comprise an oxide support material comprising one or more of a stabilized alumina, silica, zirconia, ceria, and titania. Stabilizers may be selected from zirconium (Zr), lanthanum (La), aluminum (Al), yttrium (Y), praseodymium (Pr), neodymium (Nd), an oxide thereof, a composite oxide or mixed oxide of any two or more thereof, or at least one alkaline earth metal, e.g., barium (Ba). If each oxide support material is stabilized, the stabilizers may be the same or different. The oxide support material can be $Al_2O_3$ and $CeO_2$. Where the oxide support material is $Al_2O_3$, it may be alpha-, gamma-, beta-, delta-, or theta-$Al_2O_3$, for example. The support material can be in the form of mixed oxides or stabilized mixed oxides. The metal oxides in mixed oxides are present in the form of a single phase, while stabilized mixed oxides are present in two phases. Preferably the oxidation layer washcoat comprises Cu and Mn, as the first and second metals, alumina and either $CeO_2/ZrO$ or a Zr-stabilized $CeO_2$ mixed oxide. The Zr-stabilized $CeO_2$ mixed oxide can comprise Ce and Zr in about a 1:1 mole ratio. The oxide support material can be La-stabilized $Al_2O_3$ and Zr-stabilized $CeO_2$. The oxide support material in the oxidation layer washcoat can comprise about 20 mole % La-stabilized $Al_2O_3$ and about 80 mole % Zr-stabilized $CeO_2$. The SCR layer washcoat can comprise a molecular sieve selected from the group consisting of MOR (mordenite), FER (ferrierite), FAU (zeolite Y), MFI (ZSM-5), BEA (beta zeolites), Fe-BEA, CHA (Chabazite), Cu-CHA and a silicoaluminophosphate comprising a structurally similar framework. The SCR layer washcoat can preferably comprise a Fe-BEA or a Cu-CHA zeolite catalyst. Preferably, the SCR layer washcoat can comprise a Fe-BEA or a Cu-CHA zeolite catalyst and the oxidation layer washcoat can comprise Cu and Mn. The catalyst in the oxidation layer washcoat can be present at a concentration of 0.3 to 1.5 g per in$^3$, based on the total weight of metal in the catalyst. The catalyst in the SCR layer washcoat can be present at a concentration of 0.5 to 2.5 g per in$^3$, based on the total weight of metal in the catalyst. The ratio of the amount of catalyst in the SCR layer washcoat (in g per in$^3$) to the amount of catalyst in the oxidation layer washcoat (in g per in$^3$) can be between 0.3 and 8.3, based on the total weight of metal in each layer of the catalyst.

In still another aspect of the invention, a method for reducing the concentration of ammonia in a flue gas stream generated by a combustion source comprises contacting a flue gas stream comprising ammonia with either: (1) an ammonia slip catalyst comprising a mixture of an SCR catalyst, as described above, and an oxidation catalyst comprising at least one first metal selected from the group consisting of copper (Cu), iron (Fe), is cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), and the ammonia slip catalyst does not comprise a platinum group metal; or (2) a dual layer ammonia slip catalyst comprising an SCR layer comprising a molecular sieve, preferably having a substituted metal and/or an extra framework metal, or a vanadium/titania and the oxidation layer comprising an oxidation catalyst comprising at least one first metal selected from the group consisting of copper (Cu), iron (Fe), is cobalt (Co), nickel (Ni), and chromium (Cr) and at least one second metal selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), and strontium (Sr), and the second layer does not comprise a platinum group metal. Each of the at least one first metal and second metal can be in the form of a salt, preferably a nitrate, sulfate, chloride or an acetate, an oxide, or a compound containing the metal where the compound containing the metal forms an oxide of the metal upon calcination. Preferably the first metal is Cu and the second metal is Mn. The second layer can further comprise an oxide support material comprising alumina ($Al_2O_3$), silica ($SiO_2$) zirconia ($ZrO_2$), ceria ($CeO_2$), and titania ($TiO_2$), or mixtures thereof. The oxide support material can further comprise other oxide materials such as perovskites, nickel oxide (NiO), manganese dioxide ($MnO_2$), praseodymium (III) oxide ($Pr_2O_3$). The oxide support material can include composite oxides or mixed oxides of two or more thereof (such as $CeZrO_2$ mixed oxides, $TiZrO_2$ mixed oxides, $TiSiO_2$ mixed oxides, and $TiAlO_x$ oxides where x is dependent on the ratio of $TiO_2$ to $Al_2O_3$.). The oxide support material, in addition for serving as a support may also serve as a binder. For example, alumina may act as both a support and a binder in an alumina and $CeZrO_2$ mixed oxide. The second layer can comprise an oxide support material comprising one or more of a stabilized alumina, silica, zirconia, ceria, and titania. Stabilizers may be selected from zirconium (Zr), lanthanum (La), aluminum (Al), yttrium (Y), praseodymium (Pr), neodymium (Nd), an oxide thereof, a composite oxide or mixed oxide of any two or more thereof, or at least one alkaline earth metal, e.g., barium (Ba). If each oxide support material is stabilized, the stabilizers may be the same or different. The oxide support material can be $Al_2O_3$ and $CeO_2$. Where the oxide support material is $Al_2O_3$, it may be alpha-, gamma-, beta-, delta-, or theta-$Al_2O_3$, for example. The support material can be in the form of mixed oxides or stabilized mixed oxides. The metal oxides in mixed oxides are present in the form of a single phase, while stabilized mixed oxides are present in two phases. Preferably the second layer comprises Cu and Mn, as the first and second metals, alumina and either $CeO_2/ZrO$ or a Zr-stabilized $CeO_2$ mixed oxide. The Zr-stabilized $CeO_2$ mixed oxide can comprise Ce and Zr in about a 1:1 mole ratio. The oxide support material can be La-stabilized $Al_2O_3$ and Zr-stabilized $CeO_2$. The oxide support material in the second layer can comprise about 20 mole % La-stabilized $Al_2O_3$ and about 80 mole % Zr-stabilized $CeO_2$. The first layer can comprise a zeolite selected from the group consisting of MOR (mordenite), FER (ferrierite), FAU (zeolite Y), MFI (ZSM-5), BEA (beta zeolites), Fe-BEA, CHA (Chabazite) and Cu-CHA, or a silicoaluminophosphate comprising a structurally similar framework. The first layer washcoat can preferably comprise a Fe-BEA or a Cu-CHA zeolite catalyst. Preferably, the first layer can comprise a Fe-BEA or a Cu-CHA zeolite catalyst and the second layer can comprise Cu and Mn. When the second layer comprises Cu and Mn, the conversion of $NH_3$ to $N_2$ can be more selective that when a PGM based second layer is used. The catalyst in the second layer can be present at a concentration of 0.3 to 1.5 g per $in^3$, based on the total weight of metal in the catalyst. The catalyst in the first layer can be present at a concentration of 0.5 to 2.5 g per $in^3$, based on the total weight of metal in the catalyst. The ratio of the amount of catalyst in the first layer (in g per $in^3$) to the amount of catalyst in the second layer (in g per $in^3$) can be between 0.3 and 8.3, based on the total weight of metal in each layer of the catalyst.

The flue gas can contact the dual layer ammonia slip catalyst at temperatures from about 300° to about 500° C.

The use of the oxidation layer comprising the oxidation catalysts comprising at least one first metal and the at least one second metal from the groups of metal listed above eliminates the need for the use of platinum group metals (PGM) in the composition. This will significantly reduce the cost of the composite catalyst.

EXAMPLES

Although the invention is illustrated and described herein with reference to specific embodiments, the invention is not intended to be limited to the details shown. Rather, various modifications may be made in the details within the scope and range of equivalents of the claims and without departing from the invention.

Three catalysts, each having a first layer and a second layer, were prepared. Each of the catalysts had an SCR layer comprising a Fe beta zeolite SCR catalyst. Example 1 contained Cu, Mn, $CeO_2/ZrO_2$, and alumina in an oxidation layer. Comparative Example 1 contained 5 g/ft³ Pt in an oxidation layer and Comparative Example 2 contained 20 g/ft³ Pd in an oxidation layer. In prior art, layered ammonia slip catalysts with a zeolite overlayer contained an underlayer with precious metals components here used to oxidize the incoming ammonia.

Example 1

Base Metal Ammonia Slip Catalyst (ASC)

The oxidation layer was prepared by mixing the required amount of unmilled $CeO_2/ZrO_2$ and deionized water to form a slurry. The $CeO_2/ZrO_2$ slurry was then milled to provide a d50 of 1.5-2.5 μm. The milled $CeO_2/ZrO_2$ was mixed with a slurry of alumina slurry, then the required amount of manganese acetate crystals were added and the mixture was mixed for 4 hours. The required amount of copper nitrate was added and the slurry was mixed for 30 minutes. Actigum was then added slowly to thicken the slurry. The slurry was coated onto a 230 cpsi cordierite substrate, dried then calcined at 500° C. for about 3 hours. This resulted in a Cu loading of 375 g/ft³, a Mn loading of 600 g/ft³, an alumina loading of 0.55 g/in³, and a $CeO_2/ZrO_2$ loading of 2.2 g/in³.

The SCR layer was prepared by adding a BEA zeolite to a solution of iron nitrate and mixing the slurry with a dispersion mixer. A slurry of milled alumina having a d50 of 3.4-4.2 μm and deionized water was added to the slurry containing the BEA zeolite and the resulting slurry was mixed. The required amount of binder, Disperal, was added to the slurry and the slurry was mixed before coating the oxidation layers.

The slurry was coated onto a 230 cpsi cordierite substrate, dried then calcined at 500° C. for about 3 hours. This resulted in an iron loading of 190 g/ft³, a BEA zeolite loading of 1.90 g/in³ and an alumina loading of 0.16 g/in³.

Comparative Example 1

Pt ASC

The first catalyst layer was prepared by mixing the required amount of an alumina washcoat having a $d_{50}$ of about 3.4-4.2 μm and deionized water using a high shear mixer to for a slurry. Succinic acid was slowly added to the alumina slurry until the final concentration was about 100 g/ft³, and then the admixture was continuously stirred for at least 30 minutes. The required amount of platinum nitrate was added and the resulting admixture was stirred for an additional 60 minutes. Hydroxyethyl cellulose (Natrasol) was added and the slurry was mixed for 24 hours. The slurry was coated onto a 230 cpsi cordierite substrate, dried then calcined at 500° C. for about 3 hours. This resulted in a Pt loading of 5 g/ft³ and an alumina loading of 0.35 g/in³.

The SCR layer was prepared and coated over the oxidation layers as described above in Example 1.

Comparative Example 2

Pd ASC

The first catalyst layer was prepared by mixing the required amount of an alumina washcoat having a $d_{50}$ of about 3.4-4.2 µm and deionized water using a high shear mixer to for a slurry. Succinic acid was slowly added to the alumina slurry until the final concentration was about 100 g/ft$^3$, and then the admixture was continuously stirred for at least 30 minutes. The required amount of palladium nitrate was added and the resulting admixture was stirred for an additional 60 minutes. Hydroxyethyl cellulose (Natrasol) was added and the slurry was mixed for 24 hours. The slurry was coated onto a 230 cpsi cordierite substrate, dried then calcined at 500° C. for about 3 hours. This resulted in a Pd loading of 20 g/ft$^3$ and an alumina loading of 0.35 g/in$^3$.

The SCR layer was prepared and coated over the oxidation layers as described above in Example 1.

Evaluation of the catalytic activity of the catalysts used a two zone system with an SCR catalyst in the front zone followed by different ammonia slip catalysts in the rear zone. The main constituents of the gas feed contained a mixture of 40 ppm $NH_3$ and 30 ppm NOx, with the remaining gas composition consisting of $O_2$, $H_2O$, $CO_2$, propane, propene, and $N_2$. The steady state testing was done between 250° C.-500° C. at a system GHSV of 20,000 (40,000 through each zone).

Figure 2:
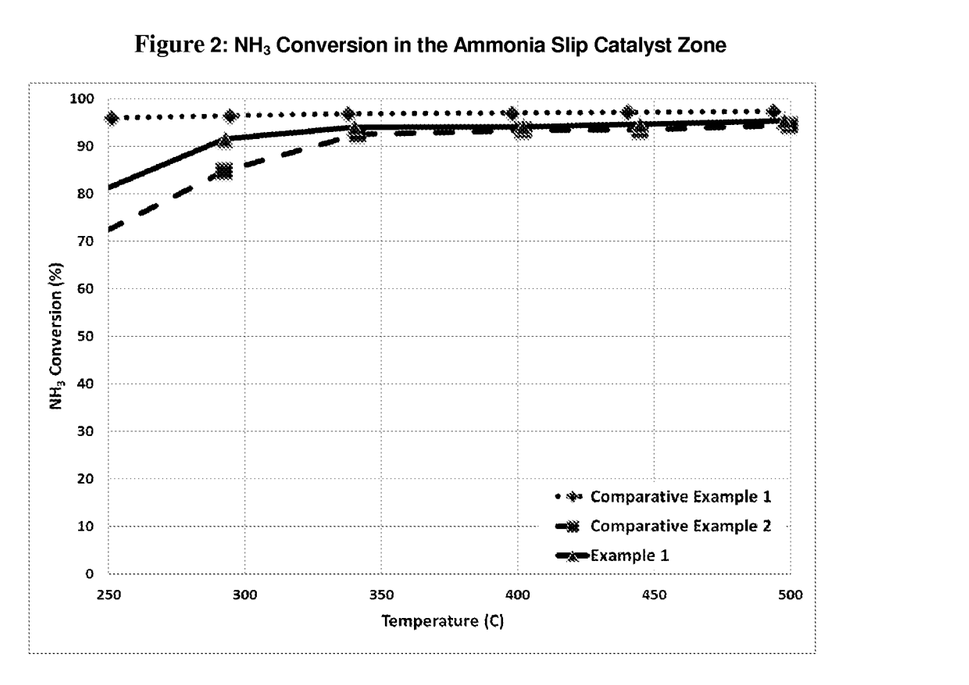
FIG. 2 is a graph illustrating the percentage of $NH_3$ conversion in the ammonia slip catalyst zone according to an embodiment of a catalyst of the present invention as compared $NH_3$ conversions using two different platinum group metal based catalysts.

FIG. 2 shows that the catalyst of Example 1, a catalyst of the invention, was more effective than the catalyst of Comparative Example 2, which contained 20 g/ft$^3$ Pd, in the conversion of $NH_3$ from 250° C. to 500° C. The catalyst of Example 1 was especially more effective that the catalyst of Comparative Example 2 at temperatures from about 250° C. to about 350° C. The catalyst of Example 1 was less effective in the conversion of $NH_3$ than the catalyst of Comparative Example 1, which contained 5 g/ft$^3$ Pt, over this temperature range.

Figure 3:
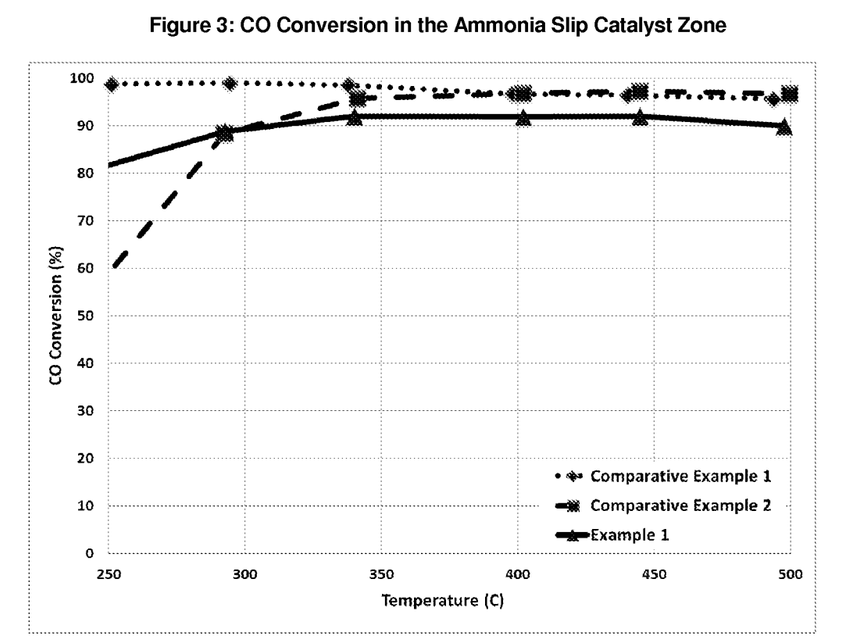
FIG. 3 is a graph illustrating the percentage of NOx selectivity in the ammonia slip catalyst zone according to an embodiment of a catalyst of the present invention as compared $NH_3$ conversions using two different platinum group metal based catalysts.

FIG. 3 shows that the catalyst of Example 1, a catalyst of the invention, was more effective than the catalyst of Comparative Example 2, which contained 20 g/ft$^3$ Pd, in converting CO in the range from about 250° C. to about 300° C. The catalyst of Example 1, a catalyst of the invention, was slightly less effective in converting CO than the catalysts of Comparative Examples 1 and 2 at temperatures from about 350° C. to about 500° C.

Figure 4:
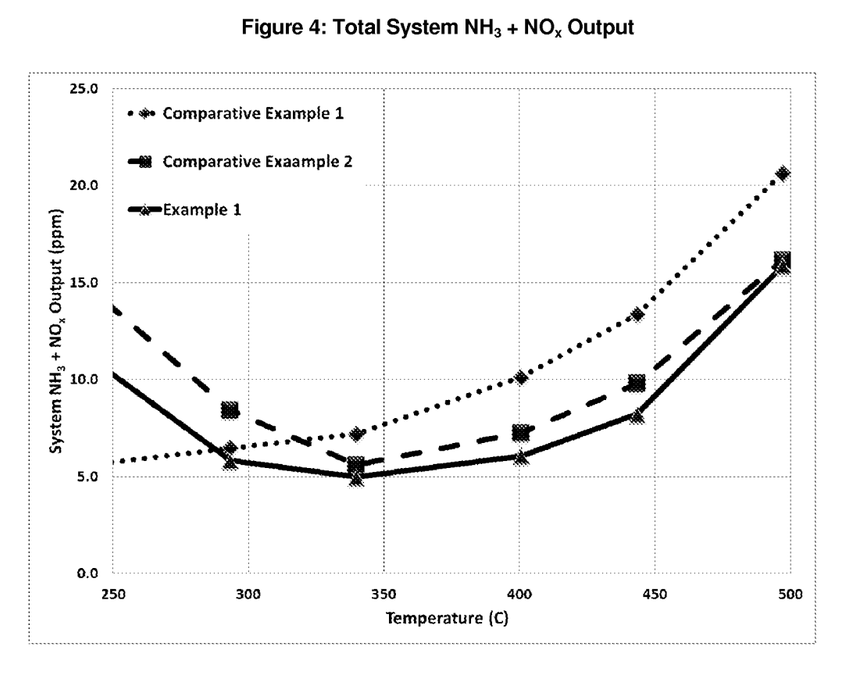
FIG. 4 is a graph illustrating the total $NH_3$ and NOx output (in ppm) in the ammonia slip catalyst zone according to an embodiment of a catalyst of the present invention as compared $NH_3$ conversions using two different platinum group metal based catalysts.

FIG. 4 shows that the catalyst of Example 1, a catalyst of the invention, was more effective than the catalysts of Comparative Examples 1 and 2, which contained 5 g/ft$^3$ Pt and 20 g/ft$^3$ Pd, respectively, in lowering the total amounts of $NH_3$ and NOx leaving the system at temperatures from about 300° C. to about 500° C. At temperatures of about 400° C. to about 500° C., the of Example 1 produced $NH_3$ and NOx at levels that were about 60% to about 75% of those produced by Comparative Example 1, which contained 5 g/ft$^3$ Pt.

What is claimed is:

1. A dual layer ammonia slip catalyst comprising an SCR layer and an oxidation layer, wherein at least the oxidation layer is positioned proximal to a substrate, wherein the SCR layer comprises a molecular sieve or a vanadium/titania SCR catalyst; and
the oxidation layer consists of:
   (a) an ammonia oxidation catalyst consisting of copper and manganese; and
   (b) an oxide support material consisting of alumina and either a $CeO_2/ZrO_2$ mixed oxide or a Zr-stabilized $CeO_2$ mixed oxide;
wherein the ammonia slip catalyst does not comprise a platinum group metal.

2. The dual layer ammonia slip catalyst of claim 1, wherein the oxidation layer further comprises an oxide support material comprising one or both of alumina and silica.

3. A method for reducing the concentration of ammonia in a flue gas stream generated by a combustion source, the method comprising contacting a flue gas stream containing ammonia with a dual layer ammonia slip catalyst of claim 1.

4. The dual layer ammonia slip catalyst of claim 1, wherein the substrate is a flow-through substrate.

5. The dual layer ammonia slip catalyst of claim 1, wherein the Zr-stabilized $CeO_2$ mixed oxide comprises Ce and Zr present in about a 1:1 mole ratio.

6. The dual layer ammonia slip catalyst of claim 1, wherein the oxide support material comprises about 20 mole % La-stabilized $Al_2O_3$ and about 80 mole % Zr-stabilized $CeO_2$.

7. The dual layer ammonia slip catalyst of claim 1, wherein the molecular sieve is selected from the group consisting of MOR (mordenite), FER (ferrierite), FAU (zeolite Y), MFI (ZSM-5), BEA (beta zeolites), Fe-BEA, CHA (Chabazite), Cu-CHA and a silicoaluminophosphate comprising a structurally similar framework.

8. The dual layer ammonia slip catalyst of claim 7, wherein the SCR layer comprises a Fe-BEA or a Cu-CHA zeolite catalyst or a silicoaluminophosphate comprising a structurally similar framework.

9. The dual layer ammonia slip catalyst of claim 8, wherein the SCR layer comprises a Fe-BEA or a Cu-CHA zeolite or a silicoaluminophosphate comprising a structurally similar framework catalyst and the oxidation layer comprises Cu and Mn.

10. The dual layer ammonia slip catalyst of claim 1, wherein the catalyst in the oxidation layer is present at a concentration of 0.3 to 1.5 g per in$^3$, based on the total weight of metal in the catalyst.

11. The dual layer ammonia slip catalyst of claim 1, wherein the catalyst in the SCR layer is present at a concentration of 0.5 to 2.5 g per in$^3$, based on the total weight of metal in the catalyst.

12. The dual layer ammonia slip catalyst of claim 1, wherein the ratio of the amount of catalyst in the SCR layer (in g per in$^3$) to the amount of catalyst in the oxidation layer (in g per in$^3$) is between 0.3 and 8.3, based on the total weight of metal in each layer of the catalyst.

13. The dual layer ammonia slip catalyst of claim 1, wherein the SCR layer is positioned as an overlayer over the oxidation layer or the oxidation layer is located sequential to the SCR layer.

* * * * *